United States Patent [19]

Shirokura et al.

[11] Patent Number: 5,340,906
[45] Date of Patent: Aug. 23, 1994

[54] PROCESS FOR THE PREPARATION OF POLYESTER CONTAINING LITTLE DEPOSITED ANTIMONY PARTICLES AS IMPURITIES

[75] Inventors: Yukio Shirokura; Fumiyuki Suzuki; Tohru Ogura, all of Shizuoka, Japan

[73] Assignee: Fuji Photo Film Co., LTD., Kanagawa, Japan

[21] Appl. No.: 18,543

[22] Filed: Feb. 17, 1993

[30] Foreign Application Priority Data

Feb. 17, 1992 [JP] Japan .................................. 4-29173

[51] Int. Cl.$^5$ .................. C08G 63/02; C08G 63/78; C08G 63/00
[52] U.S. Cl. .................................. 528/274; 528/176; 528/180; 528/181; 528/272; 528/285; 528/277; 528/293
[58] Field of Search ............... 528/274, 272, 285, 293, 528/277, 176, 180, 181

[56] References Cited

U.S. PATENT DOCUMENTS 3,929,728 12/1975 Chimura et al. ............... 528/285
4,782,132 11/1988 Nozawa et al. ............... 528/193

FOREIGN PATENT DOCUMENTS

| | | |
|---|---|---|
| 0398624 | 11/1990 | European Pat. Off. . |
| 0462844 | 12/1991 | European Pat. Off. . |
| 37-6142 | 6/1962 | Japan . |
| 51-70269 | 6/1976 | Japan . |
| 55-84322 | 6/1980 | Japan . |
| 64-69623 | 3/1989 | Japan . |
| 1-185355 | 7/1989 | Japan . |
| 1-287133 | 11/1989 | Japan . |
| 3-215522 | 9/1991 | Japan . |

*Primary Examiner*—John Kight, III
*Assistant Examiner*—Terressa Mosley
*Attorney, Agent, or Firm*—Sughrue, Mion, Zinn, Macpeak & Seas

[57] ABSTRACT

Disclosed is a process for the preparation of polyester having an ethylene-terephthalate recurring-unit in the amount of not less than 60 molar % of the total recurring-unit of the polyester by polymerizing a bifunctional carboxylic acid comprising terephthalic acid and glycol comprising ethylene glycol in the presence of an antimony compound, at least one metal compound selected from the group consisting of a glycol-soluble magnesium compound, a glycol-soluble manganese compound and a glycol-soluble zinc compound, a hindered phenol compound, and a sulphur-containing ester compound, wherein the metal compound, the hindered phenol compound and a sulphur-containing ester compound are employed under the following conditions:

$$0.015 \leq A \leq 0.15 \quad \text{(I)}$$

$$0.01 \leq B \leq 0.2 \quad \text{(II)}$$

$$0.01 \leq C \leq 0.2 \quad \text{(III)}$$

$$0.5 \leq B/C \leq 2.0 \quad \text{(IV)}$$

in which A represents an amount by molar % in terms of metal atom of the metal compound based on the amount of the total acid component constituting the polyester, B represents an amount by weight % of the hindered phenol compound based on the amount of the polyester and C represents an amount by weight % of the sulphur-containing ester compound based on the amount of the polyester.

3 Claims, No Drawings

PROCESS FOR THE PREPARATIN OF POLYESTER CONTAINING LITTLE DEPOSITED ANTIMONY PARTICLES AS IMPURITIES

FIELD OF THE INVENTION

The present invention relates to a process for the preparation of polyester employing an antimony compound as polymerization catalyst, and particularly relates to a process for preparing polyester which shows excellent electrostatic characteristics in a film casting procedure and contain little foreign matter.

BACKGROUND OF THE INVENTION

Polyester, especially having an ethylene-terephthalate recurring-unit as a main unit, is excellent in chemical resistance, heat resistance and light resistance, and shows excellent characteristics in electric, mechanical and physical properties. Therefore, the polyester is widely employed for the preparation of a film, a fiber or a mold. Such polyester is prepared by the steps of esterifying terephthalic acid with ethylene glycol to obtain glycol ester of terephthalic acid and/or a low molecular weight polymer thereof, and polycondensating the ester and the low molecular weight polymer in the presence of a polymerization catalyst.

As examples of the polymerization catalyst, there have been known metal-containing compounds such as an antimony compound, a germanium compound, a titanium compound and an organic tin compound, and nonmetal compounds such as an organic sulfinic acid compound. The antimony compound, especially antimony trioxide, is generally employed from the viewpoint of polymerization activity, low coloration of the resulting polyester and cost performance. Although the antimony compound exhibits an excellent polymerization activity, the compound is deposited in the course of synthesis of polyester to form its particle which is insoluble in the resultant polyester.

A polyester film is prepared by the steps of extruding melted polyester in the form of sheet from an extruder, feeding the sheet-shaped polyester onto the casting drum to rapidly cool and biaxially (lengthwise and crosswise) orienting the sheet-shaped polyester to form the polyester film. In order to enhance the productivity of the polyester film, it is effective to increase a film-formation rate by increase of a periphery speed of the drum. As a process of enabling the speed of film formation to increase, there has been known an electrostatic application process which comprises preparing a uniform film by closely bonding melted polyester onto the surface of the casting drum of an extruder, the extruder being provided with an electrode in the form of wire between an extruder head and the surface of the casting drum (Japanese Patent Publication No. 37-6142).

In order to enhance the film-formation speed utilizing the electrostatic application process, there have been proposed processes for preparation of polyester film such as a process employing an alkali or alkali earth metal or its compound in the polymerization step (Japanese Patent Provisional Publication No. 51-70269) and a process employing an ethylene glycol-soluble magnesium compound or manganese compound and phosphorous acid (or its salt) or phosphoric acid (or its salt) in the polymerization step (Japanese Patent Provisional Publication No. 55-84322). These processes bring about enhancement of adaptability for the electrostatic application process to increase the film-formation speed because of increase of the amount of electric charge to be deposited on the surface of the polyester.

However, addition of the metal compound to the reaction materials for preparing polyester (polyester-synthesizing system) in the presence of an antimony compound as the polymerization catalyst results in deposition of black particles insoluble in the resultant polyester, the particles being metal particles derived from the antimony compound. Further, the resultant polymer is colored due to use of both the antimony compound and the metal compound. In the case that the polyester containing the above black particles is used in the film formation by means of the extruder, a filter used in extrusion of the melted polyester is clogged with the particle to increase pressure on the filter. Further, a polyester film prepared from the polyester containing the particle can be hardly utilized for the preparation of photographic films.

To solve the above problems, Japanese Patent Provisional Publication No. 1-287133 proposes a process employing a glycol-soluble magnesium compound, manganese compound or zinc compound, imidazole (or its salt) or its derivative and phosphorous compound in the polyester-polymerization step. The process brings about decrease of both the number of the particles in the resultant polyester and the coloration of the polyester. However, the film has not sufficient characteristics to be adopted for the preparation of photographic films.

As processes for decreasing the sizes or the amount of the deposited particles derived from the antimony compound in which any of magnesium compound, manganese compound and zinc compound are not used, there have been known a process employing calcium carbonate or silicon oxide in the polyester-polymerization step (Japanese Patent Provisional Publication No. 64-69623), a process employing antimony trioxide together with a specific amount of bismuth in the polymerization step (Japanese Patent Provisional Publication No. 1-185355) and a process employing antimony trioxide which has a reducing property for ethylene glycol and contains a specific amount of bismuth or selenium in the polymerization step (Japanese Patent Provisional Publication No. 3-215522).

Even when these processes are employed to the preparation of polyester in the presence of magnesium compound, manganese compound or zinc compound, the amount (or the size) of the deposited particles cannot be satisfactorily reduced.

Accordingly, any conventional processes for preparation of polyester employing an antimony compound does not give a polyester film suitable for the preparation of a photographic supports, photographic films for original printing plates or micro films in which it is needed to extremely reduce the amount of foreign matters (impurity particles) such as the above particles derived from the antimony compound in the polyester.

SUMMARY OF THE INVENTION

It is an object of the present invention to provide an improved process for the preparation of polyester containing little deposited antimony particles with keeping high electrostatic application characteristics which employs an antimony compound as a polymerization catalyst.

It is another object of the invention to provide a process for the preparation of polyester suitable for the preparation of photographic support films.

There is provided by the present invention a process for the preparation of polyester having an ethylene-terephthalate recurring-unit in the amount of not less than 60 molar % of the total recurring-unit of the polyester by polymerizing a bifunctional carboxylic acid comprising terephthalic acid and glycol comprising ethylene glycol in the presence of an antimony compound, at least one metal compound selected from the group consisting of a glycol-soluble magnesium compound, a glycol-soluble manganese compound and a glycol-soluble zinc compound, a hindered phenol compound, and a sulphur-containing ester compound, wherein the metal compound, the hindered phenol compound and a sulphur-containing ester compound are employed under the following conditions:

$$0.015 \leq A \leq 0.15 \quad \text{(I)}$$

$$0.01 \leq B \leq 0.2 \quad \text{(II)}$$

$$0.01 \leq C \leq 0.2 \quad \text{(III)}$$

$$0.5 \leq B/C \leq 2.0 \quad \text{(IV)}$$

in which A represents an amount by molar % in terms of metal atom of the metal compound based on the amount of the total acid component constituting the polyester, B represents an amount by weight % of the hindered phenol compound based on the amount of the polyester and C represents an amount by weight % of the sulphur-containing ester compound based on the amount of the polyester.

The preferred embodiments are described below.

(1) The process for the preparation of polyester wherein the hindered phenol compound is a compound having a structural unit represented by the following formula (V):

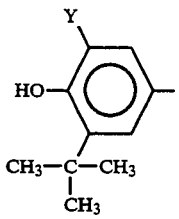

wherein Y represents methyl or ethyl.

(2) The process for the preparation of polyester wherein said sulphur-containing ester compound is a compound having the following formula (VI) or (VII):

$$(R^1SR^2COOCH_2)_4C \quad \text{(VI)}$$

$$S(R^3COOR^4)_2 \quad \text{(VII)}$$

wherein $R^1$ and $R^4$ represent alkyl of 5 to 30 carbon atoms or aryl of 5 to 30 carbon atoms, $R^2$ and $R^3$ represent alkylene of 1 to 9 carbon atoms.

(3) The process for the preparation of polyester wherein a nitrogen-containing compound is further employed in the amount satisfying the following condition (VIII):

$$5 \leq D \leq 50 \quad \text{(VIII)}$$

wherein D represents an amount by ppm by weight based on the amount of the polyester.

The process for the preparation of polyester according to the invention enables the preparation of polyester containing little deposited antimony particles (impurity particles) with keeping high electrostatic application characteristics, even though the antimony compound is used as a polymerization catalyst. Hence, it is possible to prepare a polyester film containing little foreign matter and having little coloration at a high film-forming rate. Such polyester film is appropriate for the preparation of photographic supports, photographic films for original printing plates or micro-films.

DETAILED DESCRIPTION OF THE INVENTION

In the preparation of polyester having an ethylene-terephthalate recurring-unit in the presence of an antimony compound and a glycol-soluble magnesium compound, manganese compound or zinc compound which gives electrostatic application characteristics to the resultant polyester, reduction of the antimony compound is greatly promoted. The promoted eduction brings about increase of the number of antimony metal particles and enlargement of their sizes. Then, the present inventors have studied to obviate the above problems. As a result, the inventors have discovered that the reduction is depressed by incorporating of a hindered phenol compound and a sulphur-containing ester compound into the reaction mixture for preparing polyester.

Polyester of the invention means polyester having an ethylene-terephthalate recurring-unit in the amount of not less than 60 molar % of the total recurring-unit. The polyester may contain other recurring-units within the amount of less than 40 molar %. As examples of the bifunctional carboxylic acid which may constitute other recurring-units (other than terephthalic acid), there can be mentioned aromatic carboxylic acids such as isophthalic acid and naphthalene dicarboxylic acid, alicyclic dicarboxylic acids such as 1,4-cyclohexane dicarboxylic acid and diphenylmethane dicarboxylic acid, and aliphatic dicarboxylic acids such as adipic acid and sebacic acid. As examples of the glycol which may constitute other recurring-unit (other than ethylene glycol), there can be mentioned diethylene glycol, polyethylene glycol, butane diol, cyclohexane dimethanol and xylylene glycol.

The process of the preparation of polyester according to the invention generally adopts the steps comprising esterification reaction of the bifunctional carboxylic acid and glycol, or the transesterification reaction of the bifunctional carboxylic acid ester or a derivative thereof and glycol, and a conventional method to further polymerize (polyesterify) a reaction product obtained by the esterification reaction or the transesterification reaction to prepare a polyester. The process of the invention can be performed by any of a batch process, a semi-continuous process or a continuous process.

For example, the preparation of polyethylene-terephthalate according to a batch process is conducted in the following manner.

Terephthalic acid and ethylene glycol are mixed to give a slurry in a reaction vessel for esterification. Otherwise, terephthalic acid and ethylene glycol are mixed to give a slurry before they are introduced into the reaction vessel. The ratio of terephthalic acid and ethylene glycol is preferred to be in the range of 1:1.05 to 1:2.5 (terephthalic acid: ethylene glycol) by mole.

Then, the reaction vessel having terephthalic acid and ethylene glycol (reaction materials) therein is heated and hence terephthalic acid and ethylene glycol undergo esterification reaction. The reaction is preferably carried out while stirring the reaction materials and keeping the reaction temperature in the range of 240° to 280° C. by heating. Pressure inside the reaction vessel is preferably controlled at atmospheric pressure or a higher pressure, and further preferably is at pressure of not higher than 5 kgG/cm². The esterification reaction is promoted while removing water (by-product water) released thorough the esterification and is complete when the releasing of the water stops.

Subsequently, a polycondensation reaction of the above reacted product is initiated. A foreign matter in the reacted mixture may be removed by passing the mixture through a filter. The polycondensation reaction is carried out under reduced pressure at 270° to 290° C. while removing ethylene glycol released by the polycondensation reaction. To prevent bumping of the reaction mixture (solution), the reduction pressure at the initial stage is preferred to be reduced slowly. A final pressure (degree of vacuum) is generally in the range of 1 to 0.01 mmHg.

In the process of the invention, an antimony compound is employed as a polymerization catalyst. Any antimony compounds can be used so long as they have catalytic activity for the polymerization. Examples of the antimony compounds include antimony oxides such as antimony trioxide and antimony pentaoxide; antimony halides such as antimony tribromide and antimony trichloride; antimony tartrate; antimony glycolate; and antimony acetate. These antimony compounds may contain elements other than antimony, such as Pb, As, Fe, S, Cl, Ca, Se and Sb in the range of not more than 3 weight %, as impurity.

The antimony compound can be added to a reaction mixture for preparing polyester at any stages before the polycondensation reaction. The antimony-compound is, for example, added to the reaction mixture in the form of a ethylene glycol solution thereof or a slurry thereof. The antimony compound is generally added in the amount of 50 to 500 ppm (by weight) in terms of antimony metal based on a resultant polyester, preferably in the amount of 80 to 300 ppm. If the amount of addition of the antimony compound is less than 50 ppm, the polycondensation reaction does not smoothly proceed. If the amount of addition of the antimony compound is more than 500 ppm, a resultant polyester suffers from coloration of dark gray.

The glycol-soluble magnesium compound, glycol-soluble manganese compound and glycol-soluble zinc compound can be employed in the invention in the form of organic carboxylates such as acetates, oxalates and benzoate, halides and hydroxides. Examples of the compounds include magnesium acetate, manganese acetate, zinc acetate, magnesium oxalate, manganese oxalate, zinc oxalate, magnesium benzoate, manganese benzoate, zinc benzoate, magnesium chloride, manganese chloride, zinc chloride, magnesium bromide, manganese bromide and magnesium hydroxide.

In the invention, at least one of the metal compounds (the glycol-soluble magnesium compound, the glycol-soluble manganese compound and the glycol-soluble zinc compound) is employed under the following condition (I):

$$0.015 \leq A \leq 0.15 \quad (I)$$

in which A represents an amount by molar % in terms of metal atom of the metal compound based on the amount of the total acid component constituting the polyester.

If the metal compound is employed in the amount of less than 0.015 molar %, a resultant polyester does not show excellent electrostatic application characteristics owing to so high specific (insulation) resistance under melting although deposited particle derived from the antimony compound in the polyester are reduced. If the metal compound is employed in the amount of more than 0.15 molar %, the electrostatic application characteristics of a resultant polyester are no longer enhanced. Further, in this case, coloration of the polymer increases, a metal of the metal compound is deposited as a foreign matter, and the metal compound accelerates decomposition of polymer to increase generation of aldehyde, whereby the reduction of the antimony compound is promoted.

The metal compound may be added at any steps before the completion of the polycondensation reaction. The metal compound is, for example, added to the reaction mixture for preparing the polyester in the form of a glycol solution thereof or a glycol-water solution thereof.

The hindered phenol compound employed in the invention preferably has a structural unit of 2-methyl-6-t-butylphenol or 2-ethyl-6-t-butylphenol which is represented by the aforementioned formula (V). The hindered phenol compound is particularly preferred to have the following formula (IX):

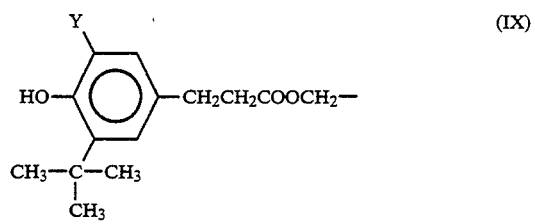

wherein Y represents methyl or ethyl.

The hindered phenol compound is apt to evaporate in a polymerization system for preparing polyester, in the case that its molecular weight is less than 500. The compound tends to form a foreign matter because it is sparingly soluble in the resultant polyester, in the case that its molecular weight is more than 1,000. Hence, the molecular weight of the hindered phenol preferably is in the range of 500 to 1,000. Preferred examples of the-hindered phenol compounds include 3,9-bis[2-{3-(3-t-butyl-4-hydroxy-5-methylphenyl)propionyloxy}-1,1-dimethyl ethyl]-2,4,8,10-tetraoxaspiro[5.5]undecane and triethylene glycol-bis[3-(3-t-butyl-4-hydroxy-5-methylphenyl)-propionate].

The sulphur-containing ester compound employed in the invention is preferred to be have the aforementioned formula (VI) or (VII). In the formula (VI) or (VII), alkyl and aryl of $R^1$ and $R^4$, and alkylene of $R^2$ and $R^3$ may have further substituents such as alkoxy (preferably methoxy and ethoxy) thereon.

Preferred examples of the sulphur-containing ester compound include pentaerythritol-tetrakis(3-laurylthiopropionate), distearyl-3,3'-thiodipropionate, dilauryl-thiodipropionate, dimyristyl-thiodipropionate and distearyl-thiodipropionate.

The hindered phenol compound and a sulphur-containing ester compound are employed under the following conditions:

$$0.01 \leq B \leq 0.2 \quad (II)$$

$$0.01 \leq C \leq 0.2 \quad (III)$$

$$0.5 \leq B/C \leq 2.0 \quad (IV)$$

wherein B represents an amount by weight % of the hindered phenol compound based on the amount of the resultant polyester and C represents an amount by weight % of the sulphur-containing ester compound based on the amount of the resultant polyester.

If one of the hindered phenol compound and the sulphur-containing ester compound is employed in the amount of less than the amount of the condition (II) or (III), reduction of the antimony compound cannot be effectively depressed. Even if one of the compounds is employed in the amount of more than the amount of the condition (II) or (III), electrostatic application characteristics of a resultant polyester are no longer improved.

Further, the hindered phenol compound and a sulphur-containing ester compound are employed under the above condition (IV).

In more detail, when one of the hindered phenol compound and the sulphur-containing ester compound is employed in an excessively large much more amount than the amount of the other, effects such as depression of reduction of the antimony compound cannot be obtained. The effects are obtained by employing the two kinds of compounds in the almost same amount each other.

The hindered phenol compound and a sulphur-containing ester compound can be added at any stages before beginning of the polycondensation reaction. The addition of the compounds is preferred to be conducted between completion of the esterification reaction and beginning of the polycondensation.

In the invention, it is preferred to further employ a nitrogen-containing compound. Examples of the compound include imidazole and derivatives thereof (e.g., imidazole and 2-ethyl-4-methylimidazole), tertiary amines (e.g., triethylamine and pyridine) and quaternary ammonium hydroxide compounds (e.g., triethylbenzylammonium hydroxide). Preferred are imidazole and derivatives thereof.

The nitrogen-containing compound is preferably employed in the amount satisfying the following condition (VIII):

$$5 \leq D \leq 50 \quad (VIII)$$

wherein D represents an amount by ppm by weight based on the amount of the polyester.

If the nitrogen-containing compound is employed in the amount of less than 5 ppm, formation of ether bond in the resultant polyester cannot be sufficiently depressed. If the compound is employed in the amount of more than 50 ppm, the resultant polyester is apt to suffer from coloration.

In the invention, it is preferred to further employ known stabilizers such as phosphoric acid, phosphorous acid or these derivatives in combination with-the aforementioned materials (compounds). Further, other polymerization catalyst may be employed together with the antimony compound if necessary. Additives such as fluorescent a brightening agent and an antistatic agent can be added if necessary.

The present invention is further described by the following examples and comparison examples.

In the following examples and comparison examples, "part(s)" means "part(s) by weight". Procedure of all examples and comparison examples were carried out in the same manner as that of Example 1.

EXAMPLE 1

Preparation of Poly ethylene-terephthalate

In a vessel for esterification reaction were placed 100 parts of terephthalic acid and 48.6 parts of ethylene glycol. 0.084 part of Compound A-1 (see Table 1) dissolved in 1.27 parts of ethylene glycol was added thereto. The mixture in the vessel was heated with stirring to give a slurry and further heated to reach a reaction temperature of 250° C. while removing released water (by-product water) through a distilling column.

Then, the temperature of 250° C. was kept for 4 hours. After the release of water terminates, the polyester of lower molecular weight polymer (i.e., reaction product) was transferred into a vessel for polycondensation. To the vessel, 0.029 part of antimony trioxide (polymerization catalyst) suspended in 0.064 part of ethylene glycol, 0.058 part of Compound B-1 and 0.058 part of Compound C-1 suspended in 0.64 part of ethylene glycol, and 0.0023 part of a compound D-1 and 0.028 part of trimethylphosphate dissolved in 0.64 part of ethylene glycol were added in order. The Compounds A-1, B-1, C-1 and D-1 are shown in Table 1.

After completion of the addition, the reaction mixture in the vessel was stirred for 10 minutes. Then, the pressure inside the vessel was reduced gradually and the polymerization reaction was performed at 275° to 280° C. for approx. 4 hours. Thus, a polyester having intrinsic viscosity 0.66 was obtained. Almost no impurity particles were observed in the obtained polyester.

The various characteristics of the obtained polyester are set forth in Table 4.

EXAMPLES 2 TO 5 AND COMPARISON EXAMPLES 1 TO 11

In each example, the procedure of Example 1 was repeated except that materials and amounts thereof shown in Tables 1 to 3 were employed to prepare polyester.

TABLE 1

| Symbol | Structure Formula |
| --- | --- |
| A-1 | (CH$_3$COO)$_2$Mg.4H$_2$O |
| A-2 | (CH$_3$COO)$_2$Zn.2H$_2$O |
| A-3 | (CH$_3$COO)$_2$Mn.4H$_2$O |
| B-1 | |

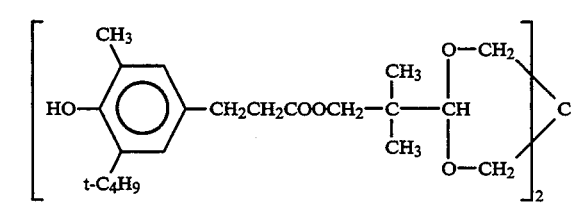

B-2

TABLE 1-continued

| Symbol | Structure Formula |
|---|---|
| |  |
| D-2 | 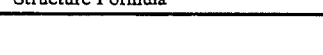 |

TABLE 2

| Example No. | Compound A (wt. parts) [molar %] | | Compound B (wt. parts) [wt. %] | | Compound C (wt. parts) [wt. %] | | B/C | Compound D (wt. parts) [ppm] | |
|---|---|---|---|---|---|---|---|---|---|
| 1 | A-1 | (0.084) [0.065] | B-1 | (0.058) [0.050] | C-1 | (0.058) [0.050] | 1.00 | D-1 | (0.0023) [20] |
| 2 | A-2 | (0.064) [0.048] | B-1 | (0.104) [0.090] | C-1 | (0.104) [0.090] | 1.00 | D-1 | (0.0023) [20] |
| 3 | A-1 | (0.100) [0.077] | B-2 | (0.058) [0.050] | C-1 | (0.058) [0.050] | 1.00 | D-1 | (0.0023) [20] |
| 4 | A-1 | (0.084) [0.065] | B-1 | (0.058) [0.050] | C-2 | (0.058) [0.050] | 1.00 | D-2 | (0.0040) [35] |
| 5 | A-1 | (0.084) [0.065] | B-1 | (0.058) [0.050] | C-1 | (0.058) [0.050] | 1.00 | — | (—) [—] |

TABLE 3

| Comparison Example No. | Compound A (wt. parts) [molar %] | | Compound B (wt. parts) [wt. %] | | Compound C (wt. parts) [wt. %] | | B/C | Compound D (wt. parts) [ppm] | |
|---|---|---|---|---|---|---|---|---|---|
| 1 | A-1 | (0.016) [0.012] | B-1 | (0.029) [0.025] | C-1 | (0.029) [0.025] | 1.00 | D-1 | (0.0023) [20] |
| 2 | A-1 | (0.210) [0.163] | B-1 | (0.058) [0.050] | C-1 | (0.058) [0.050] | 1.00 | D-1 | (0.0023) [20] |
| 3 | A-1 | (0.084) [0.065] | B-1 | (0.0058) [0.005] | C-1 | (0.010) [0.009] | 0.58 | D-1 | (0.0023) [20] |
| 4 | A-1 | (0.084) [0.065] | B-1 | (0.013) [0.011] | C-1 | (0.0087) [0.0075] | 1.49 | D-1 | (0.0023) [20] |
| 5 | A-1 | (0.084) [0.065] | B-1 | (0.023) [0.020] | C-1 | (0.058) [0.050] | 0.40 | D-1 | (0.0023) [20] |
| 6 | A-1 | (0.084) [0.065] | B-1 | (0.058) [0.050] | C-1 | (0.023) [0.020] | 2.52 | D-1 | (0.0023) [20] |
| 7 | A-1 | (0.084) [0.065] | B-1 | (0.058) [0.050] | C-3 | (0.058) [0.050] | — | D-1 | (0.0023) [20] |
| 8 | A-1 | (0.084) [0.065] | B-1 | (0.260) [0.225] | C-1 | (0.260) [0.225] | 1.00 | D-1 | (0.0023) [20] |
| 9 | A-1 | (0.084) [0.065] | — | (—) [—] | C-1 | (0.058) [0.050] | — | D-1 | (0.0023) [20] |
| 10 | A-1 | (0.084) [0.065] | B-1 | (0.058) [0.050] | — | (—) [—] | — | D-1 | (0.0080) [69] |

Note:
[molar %] of compound A is an amount by molar % in terms of metal atom of the metal compound based on the amount of the total acid component constituting the polyester.
[wt. %] of compound B is an amount by weight % of the hindered phenol compound based on the amount of the polyester.
[wt. %] of compound C is an amount by weight % of the sulphur-containing ester compound based on the amount of the polyester. However, the compound C-3 is an ester compound containing no sulphur.
[ppm] of compound D an amount by ppm by weight based on the amount of the polyester.
B/C is a ratio by weight.

C-1  $(H_{23}C_{12}SCH_2CH_2COOCH_2)_4C$
C-2  $S(CH_2CH_2COOC_{18}H_{37})_2$

C-3  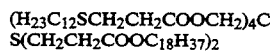

D-1  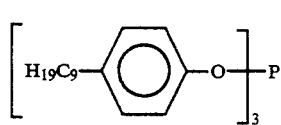

The various characteristics of each of the obtained polyesters were evaluated in the following manner.

(1) Intrinsic Viscosity (I.V.)

The polyester was dissolved in a mixture solvent of phenol and tetrachloroethane (phenol/tetrachloroethane=3/2, ratio by weight), and the intrinsic viscosity of the polyester solution was measured by means of Ubbellohde viscometer at 25° C.

(2) Hue (b value)

The hue (b value) of the polyester in the form of chip was measured by means of a color difference meter (ND-101D Type, manufactured by Nippon Densyoku Kogyo Co., Ltd.). A high b value indicates that yellowing is high.

(3) Content of DEG (diethylene glycol)

The polyester was decomposed in a methanol solution of sodium hydroxide and the amount of DEG in the polyester was measured by a gas-chromatograph. The amount of DEG is set forth by molar % based on the amount of the total glycol constituting the polyester.

(4) Number of Impurity Particle in Polyester 50 mg of the polyester were placed between two sheets of cover glasses and pressed under melting at 290° C. The pressed polyester was observed through a microscope and the number of particles having a size of not less than 0.1 μm was counted to classify the polyester in the following manner.
AA: number of particles is in the range of 0 to 10
BB: number of particles is in the range of 11 to 30
CC: number of particles is not less than 31

(5) Electrostatic Application Characteristics

An extruder which had an electrode in the form of wire between an extruder head and the surface of the casting drum, was prepared. Using the extruder, it was examined whether film formation can be satisfactorily performed at a film-formation rate of 50 m/min under application of direct current of 5 kV between the electrode and the surface of the casting drum.

(6) Number of Impurity Particles in Polyester Film

The polyester was extruded under melting and was biaxially oriented by 3.3 times in both lengthwise and crosswise the polyester sheet to form the polyester film having a thickness of approx. 100 μm. An area of 50 cm² of the polyester film was observed through a polarization microscope and the number of impurity particles having a size of not less than 10 μm was counted to classify the polyester in the following manner.
AA: number of the particles is in the range of 0 to 10
BB: number of the particles is in the range of 11 to 30
CC: number of the particles is not less than 31

TABLE 4

Characteristics of Polyester

|  | I.V. | b value | DEG (molar %) | Insoluble Particles | *Electorstatic | Foreign Matter |
|---|---|---|---|---|---|---|
| Ex. 1 | 0.66 | 3.2 | 2.4 | AA | good | AA |
| Ex. 2 | 0.64 | 3.0 | 2.7 | AA | good | AA |
| Ex. 3 | 0.65 | 3.6 | 2.7 | AA | good | AA |
| Ex. 4 | 0.66 | 3.3 | 2.5 | AA | good | AA |
| Ex. 5 | 0.65 | 3.0 | 3.0 | AA | good | AA |
| Com. 1 | 0.64 | 2.4 | 4.7 | AA | poor | AA |
| Com. 2 | 0.66 | 5.0 | 2.8 | CC | good | CC |
| Com. 3 | 0.65 | 3.7 | 2.7 | CC | good | CC |
| Com. 4 | 0.63 | 3.6 | 2.5 | CC | good | CC |
| Com. 5 | 0.64 | 3.6 | 2.7 | CC | good | CC |
| Com. 6 | 0.65 | 3.5 | 2.6 | CC | good | CC |
| Com. 7 | 0.66 | 3.7 | 2.7 | CC | good | CC |
| Com. 8 | 0.66 | 2.9 | 2.3 | BB | good | BB |
| Com. 9 | 0.66 | 3.1 | 2.5 | CC | good | CC |
| Com. 10 | 0.65 | 3.3 | 2.6 | CC | good | CC |

*Electrostatic means electrostatic application characteristics.

From the results, it is clear that the polyesters obtained in Examples 2 to 5 are excellent in electrostatic application characteristics, and films made of the polyesters contain little foreign matter. Further, the polyesters contain a nitrogen-containing compound so that DEG hardly generates in the polyester. Hence, the polyesters are appropriate for the preparation of photographic supports.

On the other hand, the results of the evaluation of the polyesters obtained in Comparison Examples 1 and 2 indicate that the addition of a less amount of a glycol-soluble magnesium compound does not give enough electrostatic application characteristics and the addition of a more amount increases impurity particles in the resultant polyester and the resultant polyester film.

The results of Comparison Examples 3 and 4 indicate that the addition of less amounts of a hindered phenol compound and a sulphur-containing ester compound cannot inhibit deposition of impurity particles.

The results of Comparison Examples 5 and 6 indicate that a hindered phenol compound and a sulphur-containing ester compound employed at a ratio which does not satisfy the condition (IV) inhibit deposition of impurity particles in the obtained polyester to some extent but cannot inhibit occurrence of impurity particles in the resultant polyester film.

The results of Comparison Example 7 indicate that no use of a sulphur-containing ester compound gives occurrence of a number of impurity particles in the resultant polyester and the resultant polyester film.

The results of Comparison Example 8 indicate that use of a hindered phenol compound more than the amount of the condition (II) and a sulphur-containing ester compound more than the amount of the condition (III), inhibits occurrence of impurity particles (which are thought to be derived from an antimony compound) but gives occurrence of impurity particles (which are thought to be impurity particles derived from the hindered phenol compound and the sulphur-containing ester compound).

We claim:

1. A process for the preparation of polyester having an ethylene-terephthalate recurring-unit in the amount of not less than 60 molar % of the total recurring-unit of the polyester by polymerizing a bifunctional carboxylic acid comprising terephthalic acid and glycol comprising ethylene glycol in the presence of
at least one antimony compound selected from the group consisting of antimony oxides, antimony halides, antimony tartrate, antimony glycolate and antimony acetate,
a hindered phenol compound having a structural unit represented by the following formula (V):

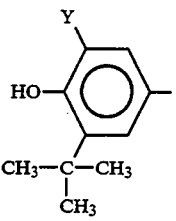

(V)

in which Y represents methyl or ethyl,
a sulphur-containing ester compound having the following formula (VI) or (VII):

(VI)

$$S(R^3COOR^4)_2 \quad (VII)$$

in which $R^1$ and $R^4$ represent alkyl of 5 to 30 carbon atoms or aryl of 5 to 30 carbon atoms, and $R^2$ and $R^3$ represent alkylene of 1 to 9 carbon atoms, and at least one metal compound selected from the group consisting of organic carboxylates, halides and hydroxides of magnesium, organic carboxylates, halides and hydroxides of manganese, and organic carboxylates, halides and hydroxides of zinc, wherein the metal compound, the hindered phenol compound and a sulphur-containing ester compound are employed under the following conditions:

| | |
|---|---|
| A ranges from 0.015 to 0.15 | (I), |
| B ranges from 0.01 to 0.2 | (II), |
| C ranges from 0.01 to 0.2 | (III), and |
| B/C ranges from 0.5 to 2.0 | (IV), | in which A represents an amount by molar % in terms of metal atom of the metal compound based on the amount of the total acid component constituting the polyester, B represents an amount by weight % of the hindered phenol compound based on the amount of the polyester and C represents an amount by weight % of the sulphur-containing ester compound based on the amount of the polyester.

2. The process for the preparation of polyester as defined in claim 1, wherein a nitrogen-containing compound is further employed in the amount satisfying the following condition (VIII):

$$5 \leq D \leq 50 \quad (VIII)$$

wherein D represents an amount by ppm by weight based on the amount of the polyester.

3. The process for the preparation of polyester as defined in claim 1, wherein said metal compound is at least one compound selected from the group consisting of magnesium acetate, manganese acetate, zinc acetate, magnesium oxalate, manganese oxalate, zinc oxalate, magnesium benzoate, manganese benzoate, zinc benzoate, magnesium chloride, manganese chloride, zinc chloride, magnesium bromide, manganese bromide and magnesium hydroxide.

* * * * *